Patented Feb. 12, 1952

2,585,242

UNITED STATES PATENT OFFICE 2,585,242

COMPOSITIONS COMPRISING ACRYLO-NITRILE POLYMERS AND ACYLATED HEXAHYDRO-S-TRIAZINES

Hugh J. Hagemeyer, Jr., and Howard N. Wright, Jr., Kingsport, Tenn., assignors to Eastman Kodak Company, Rochester, N. Y., a corporation of New Jersey No Drawing. Application February 9, 1951, Serial No. 210,286

10 Claims. (Cl. 260—30.2)

This invention is concerned with new compositions of matter and relates to compositions comprising polyacrylonitrile or interpolymers of acrylonitrile in which at least 70% by weight of the polymer is acrylonitrile. It is particularly concerned with solutions of such polymeric compositions in the completely acylated derivatives of hexahydro-s-triazines.

It is known that solutions of polymers of acrylonitrile can be prepared by dissolving such polymers in various organic solvents or in aqueous solutions of certain inorganic metal salts. Although such solutions may be adapted for spinning into fibers or for the manufacture of other shaped articles, certain difficulties are inherent in their preparation and use. Extrusion of solutions prepared with metal salts results in the formation of shaped filaments or articles carrying substantial deposits of the metal salts used. These deposits result in discontinuous or non-uniform structures and are extremely difficult to remove completely. Even when such deposits are removed, as by passage of filaments through the spinning bath, numerous voids and weak spots are left, resulting in a spongy structure which is particularly undesirable for commercially acceptable synthetic fibers. Difficulties are also encountered when the organic solvents of the prior art are used in the spinning of fibers or the manufacture of other shaped articles from solutions of acrylonitrile polymers. Polymers of acrylonitrile are difficult to dissolve in such solvents without the necessity of utilizing somewhat complicated procedures involving careful preparation of the polymer, slurrying or prolonged stirring, special steps such as precooling the solvent and mix, prolonged heating or the like. The difficulties encountered in dissolving polymers of acrylonitrile become more and more evident as the percentage of acrylonitrile contained in the polymer is increased. Even when solutions of acrylonitrile polymers have been successfully prepared, there has been a tendency for the polymers to form gel particles, particularly upon standing or exposure to air. Such particles cause clogging of the spinnerets used in the extrusion of fibers and make it necessary to provide elaborate equipment for filtration, constant mixing, heating, and to preclude contact with the atmosphere. In addition, many of the organic solvents heretofore employed have been difficult to recover from aqueous solutions, as used in spinning baths, by any simple and economical methods. Such disadvantages are particularly aggravated where the solvents fall within a class of compounds which are of a toxic or irritating nature, necessitating special precautions and equipment for the protection of personnel.

It is an object of this invention to provide organic solvents which will readily dissolve polyacrylonitrile and interpolymers of acrylonitrile in which at least 70% by weight of the polymer is acrylonitrile. Another object is to provide solutions or plasticized compositions of the above acrylonitrile polymer compositions without the necessity of special steps or prolonged heating to give a smooth clear dope. Still another object is to provide such solutions or plasticized compositions which are relatively non-susceptible to the presence of small amounts of impurities, including air, oxygen, and moisture, and which show no tendency to gel upon standing or exposure to air. A still further object is to provide solvents for the preparation of such solutions which are relatively non-toxic and non-irritating and which are easily recovered from aqueous solutions by simple methods such as distillation or extraction. Other objects will appear hereinafter.

According to our invention we accomplish the above objects by intermixing or commingling a polymer of acrylonitrile containing in the polymer molecule at least 70% by weight of acrylonitrile with a completely acylated derivative of a hexahydro-s-triazine. The solutions so obtained are clear and are, in addition, substantially free of gel particles. They show no tendency to gel upon standing or exposure to air. The solvents of our invention readily dissolve polymers of acrylonitrile without cooling and with a minimum of heating to give clear solutions. They are relatively non-toxic and non-irritating, are not susceptible to the presence of small amounts of impurities, such as air, oxygen, or moisture, and these solvents are easily recovered from water by distillation or extraction.

In the following description and examples we have set forth several of the preferred examples of our invention but they are included merely for purposes of illustration and not as a limitation thereof.

The solvents, or plasticizers, of our invention are represented by the following formula:

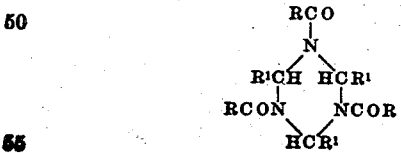

wherein either R or R¹, or both may be a hydrogen atom, or an alkyl group, e. g. methyl, ethyl, propyl, isopropyl, etc. The important solvogenic group is the carbamyl group, —CON<, and the compounds are the trimeric cyclic analogs of the monoalkyl acylamides. The monoalkyl acylamides are not solvents for the acrylonitrile polymer compositions described above and it is wholly novel and unexpected to discover that the cyclic analogs exhibit such excellent solvent power for these compositions.

The 1,3,5-triacylhexahydro-s-triazines can be prepared by the reaction of nitriles with aldehydes under dehydrating conditions. For example, acetonitrile and paraformaldehyde react in the presence of one-tenth part of acetic anhydride, using sulfuric acid as a catalyst, to form 1,3,5-triacetylhexahydro-s-triazine (Gradsten et al.—"J. A. C. S."—70, 3079):

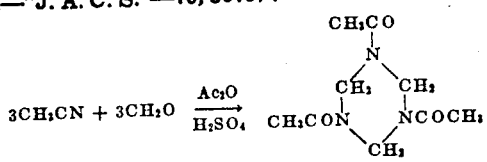

Similarly, other derivatives, as, for example, 1,3,5-triacetyl - 2,4,6 - trimethyl-hexahydro - s-triazine, or 1,3,5-tripropionyl-2,4,6-triethyl-hexahydro-s-triazine, can be prepared by using the higher aldehydes and nitriles in any desired combination.

These compounds can also be prepared by the acylation of dehydrated aldehyde ammonia products. For example, the dehydrated addition product of acetaldehyde and ammonia can be acetylated to form 1,3,5-triacetyl-2,4,6-trimethyl hexahydro-s-triazine.

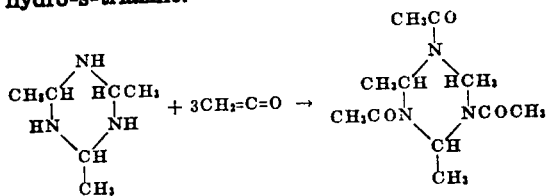

Our invention will be more fully understood by reference to the following specific examples.

Example I

Two grams of polyacrylonitrile were dissolved in ten grams of 1,3,5-triacetyl-hexahydro-s-triazine at 70° C. to form a smooth, clear dope, suitable for use in spinning to produce synthetic fibers. The dope crystallized on cooling and was remelted several times without any evidence of gelation.

Example II

One part by weight of polyacrylonitrile was powdered and ball-milled with six parts by weight of 1,3,5 - triacetyl hexahydro - s - triazine. After thorough mixing, a clear fluid melt was obtained by heating to 70–80° C. This melt was extruded into aqueous isopropanol to form a multifilament fiber which was given a draft of 9.6 and relaxed under tension in steam. The bright, colorless multifilament fiber had the properties: G./D. 4.89; percent E 19.6

Example III

One part by weight of polyacrylonitrile was mixed with six parts by weight of 1,3,5-tripropionyl hexahydro-s-triazine (Gresham—"J. A. C. S."—71, 1872). The mixture formed a clear, smooth melt at 70° C. and was spun into water and isopropanol, 20/80, to form a strong white multifilament fiber.

Example IV

Five parts by weight of polyacrylonitrile and 2 parts by weight of 1,3,5-tributyryl hexahydro-s-triazine were ball-milled to assure intimate mixing. The powder was placed in a button mold and heated to 230° C. in a nitrogen atmosphere. After cooling, a hard, clear button was ejected from the mold.

Similar moldings were formed using weight ratios of polyacrylonitrile to acylated hexahydro-s-triazine varying from 1/1 to 10/1. The triacetyl, tripropionyl, tributyryl and triisobutyryl hexahydro-s-triazines were used. These compounds have also been used with various acrylonitrile interpolymers and acryolnitrile modified by polymerization in the presence of polymers and interpolymers containing substantive groups. Such modified polymers are described in Coover and Dickey applications Serial Nos. 164,854 filed May 27, 1950; 198,761, filed December 1, 1950; and 198,762, filed December 1, 1950. Other modified polymers are described in Hagemeyer, Oglesby & Caldwell application Serial No. 166,776, filed June 7, 1950.

Monomers, whose interpolymers with acrylonitrile are particularly useful in practicing our invention, comprise compounds containing monoethylenic unsaturation of the type:

$$-CH=C<$$

or $$CH_2=C<$$

Typical compounds of the above types include, for example, vinyl formate, vinyl acetate, methyl acrylate, methyl methacrylate, ethyl acrylate, n-butyl methacrylate, vinyl chloride, styrene, 2-methylstyrene, ethylene, ethyl maleate, acrylamide, methacrylamide, N-methylacrylamide, N-methylmethacrylamide, methacrylonitrile, acrylic acid, etc. Such interpolymers can contain any desired amount of acrylonitrile, although we have found that polymers containing at least 70 percent by weight of acrylonitrile are particularly useful.

The amount of polymer in our compositions will, of course, vary, depending on whether a clear solution or a plasticized composition is desired. Generally, our compositions comprise from 5 to 90 percent by weight of acrylonitrile polymer, the remainder being the acylated hexahydro-s-triazine. Varying amounts of fillers, coloring materials, lubricants, etc., can also be added, if desired. For spinning solutions, from about 10 to 35 percent of the compositions can advantageously be the acrylonitrile polymer, while for molding compositions, larger amounts, e. g. 50 to 90 percent by weight, of acrylonitrile polymer are used.

The solvents of our invention are thus useful by virtue of the fact that they will readily dissolve polyacrylonitrile, polymers containing 70 percent or more acrylonitrile, polymer compositions obtained by polymerizing and interpolymerizing acrylonitrile in the presence of natural and synthetic macromolecular film forming substances, and mixtures of polyacrylonitrile with natural and film forming substances. They are also of interest as plasticizers, particularly those wherein the ratio of carbon to carbamyl groups is greater than 3 to 1.

Although the reasons for the novel and unexpected solvent properties of the compounds used in our invention are not fully understood, we present the following explanation:

High molecular weight materials, e. g. 40,000 to 200,000, exhibit cohesion in the solid phase due to secondary valence forces existing between chains. This is exhibited in the heat release observed during orientation or stretching, this heat release being due to the cohesive bonding being broken. The difficulty of dissolving polymers containing a preponderance of acrylonitrile is due to the presence within the polymer molecules of strong hydrogen bonding forces which result in cohesion in the solid phase. In order to dissolve these polymers, it is necessary to use a material which will undergo hydrogen-bonding with the active hydrogen bonding groups of the polymer and cause the hydrogen bonding forces to be shared between molecules of the solvent and the polymer. In other words, the adhesive forces between polymer and solvent must be greater than the cohesive forces existing between like solvent, or like polymer molecules. Then it is possible to form a molecular dispersion of the polymer within the solvent and thus form a solution.

Since the adhesive force between solvent and polymer molecules must be greater than the cohesive hydrogen bonding forces of either solvent or polymer, it is necessary that the solvent compound possess certain groups which are capable of sharing hydrogen bonding forces with the active groups of the acrylonitrile polymers. As previously discussed, the carbamyl groups, —CON<, of the solvents of our invention are the important solvogenic groups and we have now found these compounds to be capable of dissolving such polymers.

From the foregoing description and examples, it can be seen that the objects of our invention have been accomplished, and that the art is provided with a convenient and simple means of producing clear, smooth solutions of polymers of acrylonitrile, which can be spun into fibers or used in producing other shaped articles.

What we claim as our invention and desire to be secured by Letters Patent of the United States it:

1. As a new composition of matter, a polymer of acrylonitrile containing in the polymer molecule at least 70 percent by weight of acrylonitrile, and a 1,3,5-triacylhexahydro-s-triazine, the acyl group of which is the acyl group of a saturated carboxylic acid containing from 1 to 4 carbon atoms.

2. As a new composition of matter, a polymer of acrylonitrile containing in the polymer molecule at least 70 percent by weight of acrylonitrile dissolved in a 1,3,5-triacylhexahydro-s-triazine, the acyl group of which is the acyl group of a saturated carboxylic acid containing from 1 to 4 carbon atoms.

3. As a new composition of matter, a polymer of acrylonitrile containing in the polymer molecule at least 70 percent by weight of acrylonitrile dissolved in 1,3,5-triacetylhexahydro-s-triazine.

4. As a new composition of matter, a polymer of acrylonitrile containing in the polymer molecule at least 70 percent by weight of acrylonitrile dissolved in 1,3,5-triacetyl-2,4,6-trimethyl-hexahydro-s-triazine.

5. As a new composition of matter, a polymer of acrylonitrile containing in the polymer molecule at least 70 percent by weight of acrylonitrile dissolved in 1,3,5-tripropionylhexahydro-s-triazine.

6. As a new composition of matter, a polymer of acrylonitrile containing in the polymer molecule at least 70 percent by weight of acrylonitrile dissolved in 1,3,5-tributyrylhexahydro-s-triazine.

7. As a new composition of matter, polyacrylonitrile dissolved in a 1,3,5-triacylhexahydro-s-triazine, the acyl group of which is the acyl group of a saturated carboxylic acid containing from 1 to 4 carbon atoms.

8. As a new composition of matter, polyacrylonitrile dissolved in a 1,3,5-triacetylhexahydro-s-triazine.

9. As a new composition of matter, polyacrylonitrile dissolved in a 1,3,5-tripropionylhexahydro-s-triazine.

10. As a new composition of matter, polyacrylonitrile dissolved in a 1,3,5-tributyrylhexahydro-s-triazine.

HUGH J. HAGEMEYER, Jr.
HOWARD N. WRIGHT, Jr.

No references cited.